Sept. 1, 1936.                 W. N. JERNEGAN                  2,053,195
                               FENCE POST FASTENER
                               Filed April 4, 1936
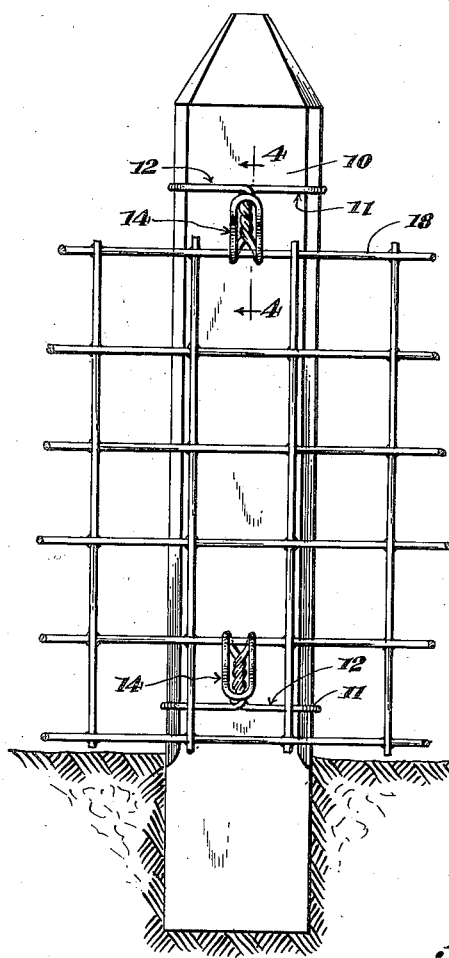
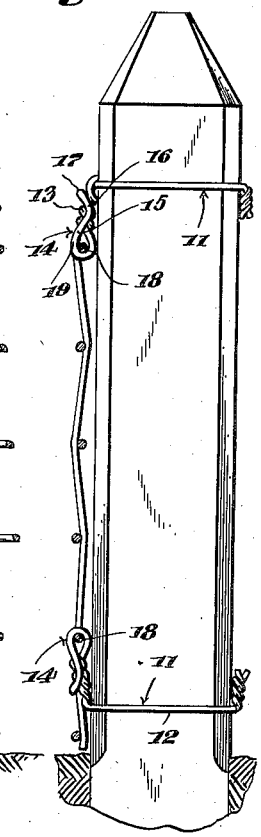
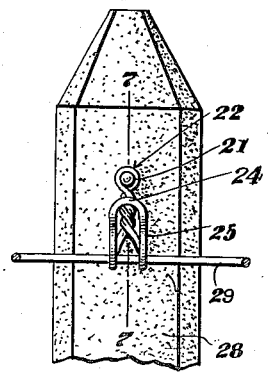
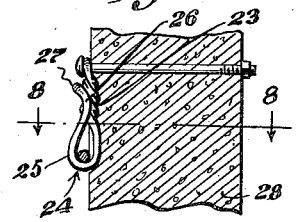
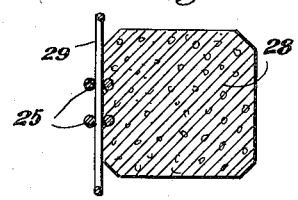
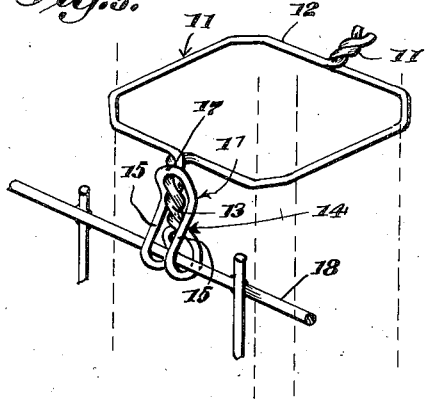
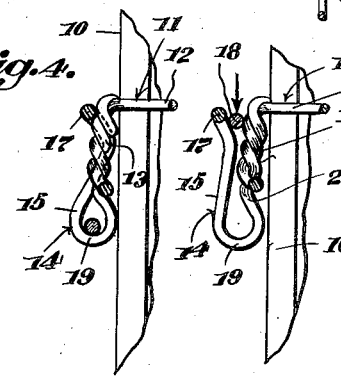
Inventor
WARREN N. JERNEGAN
By *Irving A. McCathran*
                    Attorney Patented Sept. 1, 1936

2,053,195

UNITED STATES PATENT OFFICE 2,053,195

FENCE POST FASTENER

Warren N. Jernegan, Roanoke, Va.

Application April 4, 1936, Serial No. 72,821

4 Claims. (Cl. 256—57)

This invention relates to a means for fastening a wire fence to a fence post, and the like, and one of the important objects of this invention is the production of a simple and efficient means for firmly holding a wire strand of a wire fence in engagement with a support such as a fence post and the like.

A further object of this invention is the production of a simple and efficient wire fence engaging means in the nature of a spring locking hook, so constructed as to prevent the wire strand of a wire fence from becoming accidentally detached after it has been once secured in place.

Other objects and advantages of this invention will appear throughout the following specification and claims.

In the drawing:

Figure 1 is a front elevation of a fence post showing a wire fence secured thereto;

Figure 2 is a side elevation of the fence post, the wire fence being showing in section;

Figure 3 is a perspective view of the securing hook, illustrating the manner in which the wire strand of the wire fence is engaged thereby;

Figure 4 is a transverse section taken on line 4—4 of Figure 1, showing the hook in a closed position;

Figure 5 is a similar view showing the hook partly open with the fence wire being inserted in the hook;

Figure 6 is a front elevation of a portion of a fence post showing a modified form of hook;

Figure 7 is a vertical section taken on line 7—7 of Figure 6;

Figure 8 is a transverse section taken on line 8—8 of Figure 7.

By referring to the drawing, it will be seen that 10 designates the post which is provided with a plurality of wire fence fastening members 11. These fastening members 11 preferably consist of a loop 12 which extends around or encircles the post 10 having its free ends twisted, as at 13, to close the end of the loop. The loop 12 is also provided with a spirally twisted shank 13 which extends at right angles to the plane of the loop 12, the fence fastening members being preferably secured to the post, as shown in Figure 1, wherein the shank of one member extends downwardly and the other shank extends upwardly. The shank 13 terminates in a hook portion 14 which is bent backwardly upon the shank 13, the hook portion consisting of a pair of parallel spaced strands 15 which strands are bent inwardly toward the shank portion 13, as indicated at 16, to normally lie upon opposite sides of the shank portion 13 and cause these bent portions 16 of the strands 15 to straddle the shank 13. The ends of the strand portions 16 are connected by a transversely extending curved bridge portion 17 which is so located as to normally lie when in a locked position between the spirally twisted strands of the shank portion 13, as shown clearly in Figures 3 and 4, the whole hook portion as well as loop 12 being preferably formed of spring wire or wire having a certain amount of resiliency.

By carefully considering Figures 1, 2, and 3, as well as Figures 4 and 5, it will be noted that since the strands 15 of the hook portion 14 fit upon opposite sides of the shank 13, lateral twist of the hook will be resisted, and since the bridge portion 17 will fit snugly between the spiral twists of the strands of the shank 13, the bent portions 16 of the strands 15 will be allowed to provide this straddling action, thereby providing an efficiently closed hook portion to resist accidental displacement of the fence wire 18 which is adapted to engage the hook. Because of the particular construction of the hook, it will be noted that when the hook is in a closed position, the portion of the hook engaging the fence wire or wires 18 will provide a closed eye portion 19. As stated above, the hooks 14 are preferably arranged to extend in opposite directions when applied to the posts, so as to more efficiently hold the wire fence in position. The bottom hook will resist upward pull and the top hook will resist downward pull—note particularly Figures 1 and 2.

As shown in Figure 5, the fence wire 18 may be easily forced into the hook due to the fact that the bridge portion 17 points away from the shank 13 and merely by forcing the wire 18 down between the shank and the bridge portion 17, the parallel strands 15 will be forced outwardly, as shown in Figure 5, permitting the wire 18 to be forced downwardly of the hook and into the eye portion 19. The resiliency of the strands will cause the bridge portion 17 to immediately resume its locking position by fitting between the spiral strands of the shank 13, as shown in Figure 4, when the wire 18 has been forced into the eye portion 19. The upward movement of the wire strand 18 would be resisted by the shoulder portion 20 of the eye 19 tending to resist the opening of the hook portion 14.

In Figures 6 to 8, inclusive, there is shown a modified form of the invention wherein the fastening means for the wire fence may be secured by means of a bolt, pin, or other suitable securing or anchoring medium indicated by the numeral 21. In this type of structure, an eye portion 22 is provided through which the securing pin or means 21 extends and depending from this eye portion 22 is a spirally twisted shank 23 terminating in an eye portion 24 at its lower end and providing a pair of parallel strands 25 which are bent inwardly to provide bent portions 26 which are adapted to normally straddle the shank 23 and resist lateral twisting movement of the hook. The strands 25 are connected by a bridge portion 27 which is adapted to lie snugly between certain of the spirally twisted strands of the shank in the same manner as described with respect to the preferred embodiment. In the type shown in Figure 6, which is adapted to be applied to a plastic post or other similar support, the spiral shank 23 as well as a portion of the lower end of the hook is partially embedded within the front face of the post to hold the hook against swinging movement. In the type shown in Figures 6 to 8, the plastic post or other similar support is indicated by the numeral 28 and the wire fence is indicated by the numeral 29.

It should be understood that it is not desired to limit the present invention to any particular type of wire fence since the fence may be in the nature of single strands or of a woven mesh character, and the present securing means may also be employed for securing strands of other character to any suitable or desired support without departing from the spirit of the invention.

Through the medium of the fastening device above described, it should be understood that the fence wire may be easily attached to or detached from the fence post with a minimum amount of effort.

Having described the invention, what is claimed as new is:

1. A device of the class described comprising a support, a plurality of automatic spring locking hooks secured to said support, said hooks being arranged in substantially vertical alignment one above the other and having eye portions, the eye portion of one hook pointing toward the eye portion of the other hook and constituting means for engaging wire strands of a woven wire fence for securing the strands to said support whereby upward pull will be resisted by one hook and downward pull will be resisted by the other hook, the open ends of the hooks extending away from each other.

2. A fastener for wire strands and the like comprising a body having an angularly extending spirally twisted shank terminating at one end into an eye portion consisting of a plurality of spaced strands, the spaced strands being bent backwardly along said shank in a position to straddle the shank whereby lateral twisting movement of the strands will be resisted by the shank, the strands being connected by means of a bridge portion adapted to normally lie snugly upon said shank near the end opposite the eye portion.

3. A fastener for wire strands and the like comprising a body having an angularly extending spirally twisted shank terminating at one end into an eye portion consisting of a plurality of spaced strands, the spaced strands being bent backwardly along said shank in a position to straddle the shank whereby lateral twisting movement of the strands will be resisted by the shank, the strands being connected by means of a bridge portion adapted to normally lie snugly between certain of the spirally twisted portions of the shank whereby the accidental opening of the fastener will be resisted.

4. In combination with a support, a fastener, a securing means for said fastener, said fastener constituting a hook-like structure consisting of a relatively elongated spirally twisted shank terminating in an eye portion at one end and a pair of substantially parallel strands bent backwardly and normally straddling said shank, the strands being connected by means of a bridge portion normally lying snugly upon said shank, and said spirally twisted shank being partially embedded within said support to hold said fastener against swinging movement upon said support.

WARREN N. JERNEGAN.